J. KENNEDY.
BOLT ANCHOR.
APPLICATION FILED APR. 12, 1915.
1,304,886.
Patented May 27, 1919.
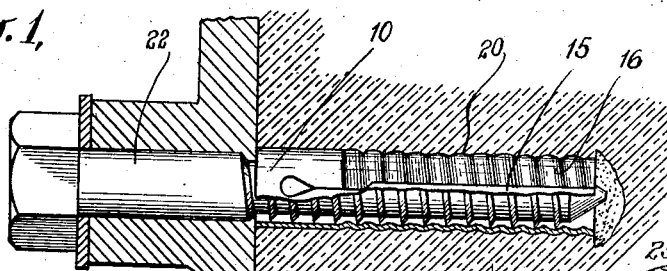
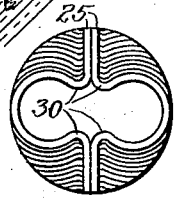
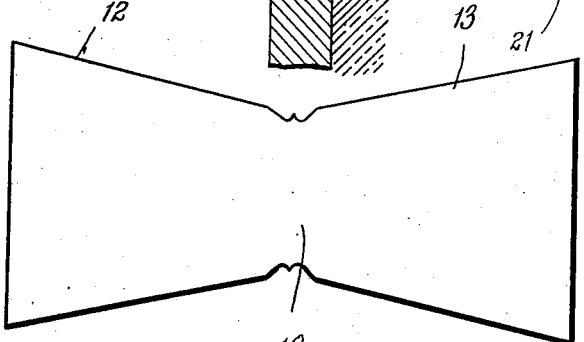
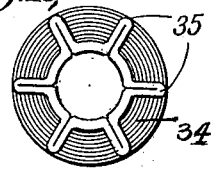
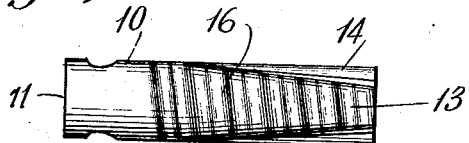
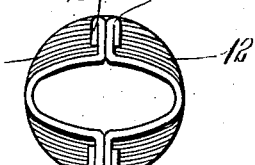
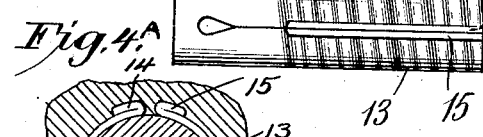
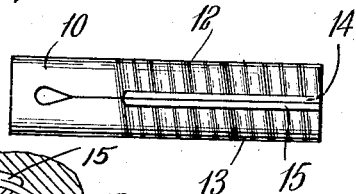
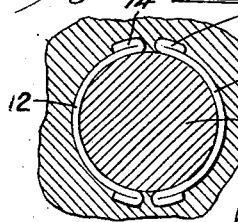
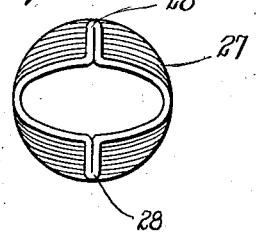
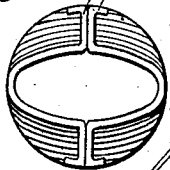
WITNESSES
INVENTOR
Joseph Kennedy
BY
E. W. Marshall
ATTORNEY

UNITED STATES PATENT OFFICE.

JOSEPH KENNEDY, OF NEW YORK, N. Y., ASSIGNOR TO THE CLEMENTS COMPANY, OF NEW YORK, N. Y., A CORPORATION OF NEW YORK.

BOLT-ANCHOR.

1,304,886.      Specification of Letters Patent.      Patented May 27, 1919.

Application filed April 12, 1915. Serial No. 20,619.

*To all whom it may concern:*

Be it known that I, JOSEPH KENNEDY, a citizen of the United States of America, and a resident of New York, county and State of New York, have invented certain new and useful Improvements in Bolt-Anchors, of which the following is a specification, reference being had to the accompanying drawings, forming a part thereof.

My invention relates to bolt anchors and the like, and has special reference to such as are longitudinally divided throughout a part or the whole of their length, or otherwise formed to provide expansion members.

One object of my invention is to provide a simple device of the aforesaid character which lends itself readily for production by a punching or stamping process and which may be manufactured in large quantities at small cost.

Another object is to provide a tubular anchor having a bore tapering inwardly toward its inner end and having ribs or folds to maintain a substantially uniform maximum or overall diameter and to produce an increasing circumferential periphery whereby the anchor will fit closely into a cylindrical hole before expansion and will have excess metal which will increasingly crowd a screw or bolt as it is inserted into the anchor.

Another object is to provide an anchor having a uniform maximum external diameter throughout its length, with a bore varying in cross-section from a full circle at its outer end to an ellipse, hour-glass shape or some other flattened curve at its inner end, and adapted to provide a plurality of well-defined lines of contact with the walls of a hole in which it is expanded.

Other objects and advantages of my invention will be set forth hereinafter, and in order that my invention may be thoroughly understood I will now proceed to describe the same in the following specification and then point out the novel features thereof in appended claims.

While as above indicated, the anchor of my present invention may readily be produced from sheet metal, my invention is by no means limited in this regard and the anchor may be produced in any suitable way and from any suitable material.

Referring to the drawings:

Figure 1 is a sectional elevation of a bolt anchor arranged and constructed in accordance with my invention in its expanded condition, as utilized for holding a bolt or screw in a wall of concrete, brick or other material.

Fig. 2 is a plan view of the punching or stamping from which the anchor of Fig. 1 is formed.

Fig. 3 is a side elevation, and

Fig. 4 is an end elevation of the same anchor.

Fig. 4<sup>A</sup> is an end elevation of the same device expanded in a wall with the bolt therein shown in section.

A plan view of the anchor is shown in Fig. 5.

Figs. 6, 7, 8, 9 and 10 are end views of modified forms of anchors which also embody my invention.

I am aware that bolt anchors having an opening of non-uniform cross-section varying from a circle at one end to a relatively narrow ellipse at the other, are well known, but so far as I am aware, the plane of the line of division between parts or members includes the major axes of the elliptical sections.

According to one embodiment of my present invention the parts or members of the anchor are formed so that the plane of complete or partial division is at right angles to the major axes of the elliptical sections and the edges adjacent to the lines of division are flanged so that the maximum transverse dimensions are substantially equal at all points along the length of the device when measured in line with either the major or minor axes of the elliptical sections of the bore.

Other embodiments of my invention may be partially or wholly subdivided in the plane of the minor axes of the flattened curve sections or may not be divided or split at all, but my invention is broadly characterized by the fact that a change in the section of the inner end of the anchor always occurs when the screw is inserted and excess metal is always provided and is formed into ribs or folds to permit the anchor to be easily inserted and closely fitted into a cylindrical hole before expansion.

The anchor shown in Figs. 1 to 5 inclusive of the drawings may be formed from sheet metal which is first stamped or punched in the form shown in Fig. 2. It has a central body 10 and a pair of flaring members 12 and 13 extending in opposite directions from the body. The blank is drawn so that the body 10 assumes a thimble-shape with the side members coöperating to form a tube, and its end is cut off to form a hole 11 which constitutes the outer open end of the anchor. In the completed anchor as shown in Figs. 3 and 4 each of the members 12 and 13 has flanges 14 and 15 at its edges, which are preferably doubled back on themselves to increase their rigidity, and transverse corrugations 16 which are adapted to receive the threads of a bolt or screw.

The stamping or punching shown in Fig. 2 may be shaped in any suitable manner to produce the tubular form shown in the other figures, the height of the flanges 14 and 15 being gradually increased toward the inner end of the anchor so that the outside transverse dimension of the anchor measured across the flanges is substantially uniform throughout its length. The bore of the anchor is circular at one end and in this particular embodiment of my invention approaches a relatively narrow ellipse at the other end, the major axis of each elliptical section being substantially equal to the inside diameter of the circular end of the bore.

The anchor may be inserted in a hole such as the hole 20 in a wall 21 of concrete or other material and will be maintained in alinement with the hole by the ends of the ellipses and the tapered flanges. When a screw or bolt such as the bolt 22 is inserted the anchor will be expanded, the elliptical sections being changed to approximately circular form and the double flanges 14 and 15 which are relatively rigid being forced firmly into the walls of the opening.

Furthermore, the sides of the anchor will be very firmly forced into contact with the walls of the opening. That this is the case, is evident from the fact that the bolt or screw is larger in diameter than the minor axes of the elliptical sections of the anchor and consequently will, when forced into the anchor, tend to do two things, viz., change the sections of the anchor from an ellipse to a circle, which tendency will force the flanges into the walls of the opening, and by reason of the fact that the first tendency is resisted, both by the resiliency of the metal and the engagement of the flanges with the walls of the opening, the members of the anchor will tend to spread apart, this second tendency causing the sides of the anchor midway between the flanges to be forced firmly into engagement with the opening.

Thus four lines of greatest contact are produced, with the result that the anchor is secured in an opening with very great rigidity.

The modified form of anchor which also embodies my invention may be produced by making the flanges either in a single plane as shown at 25 in Fig. 6, or with the metal bent at right angles as shown at 26 in Fig. 7, instead of being folded back on itself as in the form previously described.

Referring to Fig. 8, it may be seen that my invention is not limited to anchors which are divided or partially split into separate arms or expansion members, and it may be embodied in an anchor formed from a tubular metal body and having the shape illustrated in this figure. The outer end of the anchor is cylindrical having a circular section as shown at 27 and the section varies from this end of the anchor to a relatively narrow ellipse at the opposite end. The anchor has integral folds forming ribs 28 which increase in height from the outer to the inner end, maintaining the over-all diametric measurement uniform in the plane of the ribs.

When this modification is expanded by inserting a bolt the ribs are pressed outwardly and the screw or bolt tends to change the elliptical section to a circle, thus giving the desired holding effect in the wall.

Where a greater expansion is desired the anchor may be formed as shown in Fig. 9, which is another modification of my invention. The anchor is cylindrical at its outer end and is split and flanged as that of Fig. 6. However, instead of having an elliptical form at its inner end, it has an hour-glass form with inwardly extending ribs 30 adjacent to the flanges 25. Some other flattened curve sections may be formed in the anchor at its inner end instead of either the ellipse as in Figs. 4, 6, 7 and 8, or the hour-glass shape of Fig. 9.

The scope of my invention is further indicated by the modification of Fig. 10 which shows an anchor 34 without divisions or slots. It has a circular section at its outer end and its bore is of frusto-conical shape. Ribs or folds 35 which correspond to the ribs 28 of Fig. 8 are formed in its walls and extend sufficiently to make it fit closely into a cylindrical hole. One of the distinguishing features of this anchor is the periphery of its ribbed sections which increase from its outer to its inner end and so provide excess metal by which anchorage is obtained. When a screw or bolt is inserted the ribs or folds are opened, changing as in the other forms of the invention.

Various other modifications may be effected within the spirit and scope of my invention, but I intend that only such limitations be imposed as are indicated in the appended claims.

What I claim is:

1. A bolt anchor comprising a tubular body forming two expansion members divided from each other through at least a part of the length of the anchor, with a bore varying in cross-section from a circle to an ellipse from end to end, the plane of division between said members being substantially at right angles to the major axes of the elliptical sections of the anchor.

2. A bolt anchor comprising a tubular body forming two expansion members divided from each other through at least a part of the length of the anchor, each having side flanges extending outwardly in the plane of division between said members, and a bore varying in cross-section from a circle to an ellipse from end to end, said plane of division being substantially at right angles to the major axes of the elliptical sections of the anchor.

3. A bolt anchor comprising a tubular body forming two expansion members divided from each other through at least a part of the length of the anchor, each having edge flanges of varying height to maintain the overall dimensions of the anchor uniform in the plane of division between said members, and a bore varying in cross-section from a circle to an ellipse from end to end, said plane of division being substantially at right angles to the major axes of the elliptical section of the anchor.

4. A bolt anchor comprising a tubular body forming two expansion members divided from each other through at least a part of the length of the anchor, each having flanges of doubled metal extending outwardly in the plane of division between said members, and a bore varying in cross-section from a circle to an ellipse from end to end, said plane of division being substantially at right angles to the major axes of the elliptical sections of the anchor.

5. A bolt anchor comprising a tubular body having a bore varying in cross-section from a circle to an ellipse from end to end and having longitudinal ribs formed by folding the metal and extending it outwardly in the plane constituting the locus of the minor axes of the elliptical sections and varying in height to maintain the overall dimension of the anchor in the aforesaid plane, substantially uniform.

6. A bolt anchor comprising a tubular body having its inner surfaces flattened toward its inner end to thereby form a bore varying in cross-section from a circle to an ellipse from end to end and having longitudinal ribs formed by folding the metal and extending it outwardly from the flattened surfaces of the anchor.

7. A bolt anchor comprising a tubular body having a bore varying in cross-section from a circle to a flattened curve from end to end and having longitudinal ribs extending outwardly from the flattened surfaces of the anchor.

8. A bolt anchor comprising a tubular body forming two expansion members divided from each other through at least a part of the length of the anchor, each having flanges extending outwardly in the plane of division between said members, and a bore varying in cross-section from a circle to a flattened curve from end to end.

9. A bolt anchor comprising a tubular body having a tapering bore and varying in section from a circle to a contracted curve, with folded flanges adapted to be opened when a bolt is inserted.

10. A bolt anchor comprising a tubular body having a tapering bore adapted to receive the threads of a bolt, and varying in section from a circle near its outer end to a contracted curve, with folded flanges near its inner end, said flanges extending outwardly to cause the anchor to fit a cylindrical hole and being adapted to open when a bolt is inserted.

11. A bolt anchor comprising a tubular body having a tapering bore adapted to receive the threads of a bolt, and varying in section from a circle near its outer end to a contracted curve with folded flanges near its inner end, the periphery of the varying anchor sections being increased toward the inner end of the anchor to provide excess metal when a bolt is inserted.

In witness whereof I have hereunto set my hand, in the presence of two subscribing witnesses, this 2nd day of April, 1915.

JOSEPH KENNEDY.

Witnesses:
I. B. MOORE,
E. G. SCHOEING.

Copies of this patent may be obtained for five cents each, by addressing the "Commissioner of Patents, Washington, D. C."